(12) United States Patent
Thompson et al.

(10) Patent No.: US 12,298,758 B2
(45) Date of Patent: May 13, 2025

(54) SYSTEMS AND METHODS FOR OPERATING A CONTROLLER AREA NETWORK

(71) Applicant: Caterpillar Inc., Peoria, IL (US)

(72) Inventors: Brodie L. Thompson, West Ulverstone (AU); Steven Robert Krause, Chillicothe, IL (US)

(73) Assignee: Caterpillar Underground Mining Pty Ltd., Tasmania (AU)

(*) Notice: Subject to any disclaimer, the term of this patent is extended or adjusted under 35 U.S.C. 154(b) by 0 days.

(21) Appl. No.: 18/491,595

(22) Filed: Oct. 20, 2023

(65) Prior Publication Data
US 2025/0130565 A1    Apr. 24, 2025

(51) Int. Cl.
*G05D 1/00* (2006.01)
(52) U.S. Cl.
CPC ......... *G05D 1/0016* (2013.01); *G05D 1/0022* (2013.01)
(58) Field of Classification Search
CPC ............................ G05D 1/0016; G05D 1/0022
USPC .......................................................... 701/50
See application file for complete search history.

(56) References Cited

U.S. PATENT DOCUMENTS

| | | | |
|---|---|---|---|
| 7,869,920 B2 * | 1/2011 | Mark | H04L 12/282 |
| | | | 340/3.52 |
| 2020/0392696 A1 * | 12/2020 | Zuo | E02F 9/2041 |
| 2021/0123793 A1 * | 4/2021 | Dowling | B60W 40/13 |

FOREIGN PATENT DOCUMENTS

| | | | |
|---|---|---|---|
| CN | 103078357 A | * | 5/2012 |
| CN | 102799166 B | | 6/2014 |
| CN | 103078357 B | | 12/2014 |
| CN | 106516987 A | * | 3/2017 |
| CN | 106516987 B | * | 6/2018 |
| CN | 107161020 B | | 10/2020 |
| CN | 111625282 B | | 7/2023 |
| DE | 19922408 B4 | * | 5/2010 |

\* cited by examiner

*Primary Examiner* — Muhammad Shafi
(74) *Attorney, Agent, or Firm* — Lee & Hayes (57) ABSTRACT

A work machine using a distributed controller network that provides for redundant data buses is described herein. The work machine uses a controller area network that provides for redundant data buses for tier 1 controllers, or controllers that are determined to have a higher degree of importance when compared to other controllers. The controller area network uses redundancy to decrease the probability of a communication failure between tier 1 controllers and tier 2 controllers. The tier 1 controllers have communication access to two data buses between other tier 1 controllers and tier 2 controllers. Thus, if a data bus used by a tier 1 controller cannot be used by the controller, the tier 1 controller can use the other, redundant data bus to maintain communication.

20 Claims, 8 Drawing Sheets

SYSTEMS AND METHODS FOR OPERATING A CONTROLLER AREA NETWORK

TECHNICAL FIELD

The present disclosure relates to a controller area network used on a heavy work machine. More specifically, the present disclosure relates to distributing network loads on a controller area network.

BACKGROUND

Heavy work machines, such as earth-moving vehicles or hauling trucks, require significant power to carry out their functions. The machines themselves can be of substantial weight, and their loads require large amounts of power to move. Diesel engines have been used to provide that power, but they can have disadvantages. However, the use of combustion engines in enclosed mining spaces can present several challenges. For example, the exhaust from combustion engines needs to be effectively removed from underground routes in order to maintain an atmosphere hospitable to workers and reduce the addition of pollutants into the ground and the atmosphere. Further, these machines are used to move large loads of material along underground and above-ground haul routes over large distances. Supplies of diesel fuel may be far away from such locations or not easily delivered to such locations.

Electrical power has been used to supplement or replace diesel engines in these mining machines. In some environments, the electrical power is delivered from one or more batteries. The batteries are used to provide power to various electrical equipment in the work machine. For example, the batteries can provide power to equipment such as, but not limited to, electric motors for rotating the work machine wheels, inverters for converting the battery power to various other forms of electrical power, electrical pumps, pumps for hydraulic systems, and the like. These batteries can be charged while installed on the machine if a suitable connection and power source are available. In other examples, the batteries can be swapped whereby a discharged battery is removed and a charged battery is installed.

SUMMARY

In a first aspect of the presently disclosed subject matter, a controller area network to control a work machine includes a cab internal controller configured to communicate operator control data received from control inputs of the work machine to a primary controller and a steering controller, wherein the cab internal controller is a tier 1 controller that communicates with the primary controller and the steering controller over a first machine data bus or a second machine data bus, and the primary controller configured to receive the operator control data from the cab internal controller over the first machine data bus or the second machine data bus, wherein the primary controller is further configured to issue machine control data over a first inverter bus or a second inverter bus to a plurality of second controllers.

In a further aspect of the presently disclosed subject matter, a work machine includes a power unit configured to provide electrical power to the work machine, wherein the power unit is removably attached to the work machine, a cab comprising a cab internal controller configured to communicate operator control data received from a control input of the work machine to a primary controller and a steering controller, wherein the cab internal controller is a tier 1 controller that communicates with the primary controller and the steering controller over a first machine data bus or a second machine data bus, and a front section comprising a primary controller configured to receive the operator control data from the cab internal controller over the first machine data bus or the second machine data bus, wherein the primary controller is further configured to issue machine control data over a first inverter bus or a second inverter bus to a plurality of second controllers.

In a still further aspect of the presently disclosed subject matter, a controller area network of a work machine includes a cab internal controller comprising a first memory storing computer-executable instructions, and a first processor in communication with the memory, the computer-executable instructions causing the first processor to perform acts comprising, communicating operator control data received from a control input of the work machine to a primary controller and a steering controller, wherein the cab internal controller is a tier 1 controller that communicates with the primary controller and the steering controller over a first machine data bus or a second machine data bus, and a primary controller comprising a second memory storing computer-executable instructions and a second processor in communication with the memory, the computer-executable instructions causing the second processor to perform acts comprising receiving the operator control data from the cab internal controller over the first machine data bus or the second machine data bus, and issuing machine control data over a first inverter bus or a second inverter bus to a plurality of second controllers.

DETAILED DESCRIPTION

Figure 1:
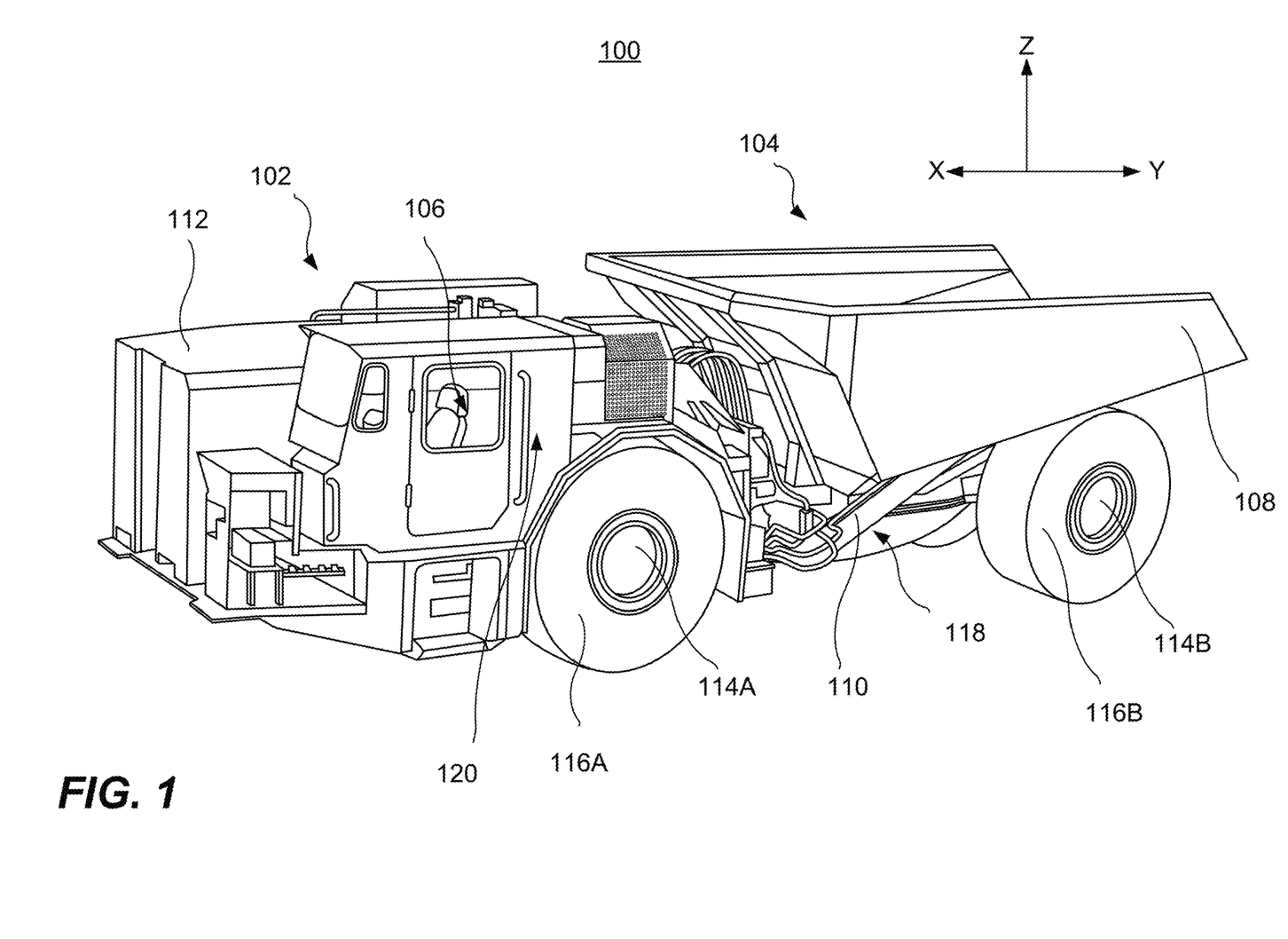
FIG. 1 illustrates an isometric view of a work machine within an XYZ coordinate system as one example suitable for carrying out the principles discussed in the present disclosure.

Wherever possible, the same reference numbers will be used throughout the drawings to refer to same or like parts. FIG. 1 illustrates an isometric view of a work machine 100 within an XYZ coordinate system as one example suitable for carrying out the principles discussed in the present disclosure. The exemplary work machine 100 travels along a mining route, typically from a source to a destination within a worksite. In one implementation as illustrated, work machine 100 is a hauling machine that hauls a load within or from a worksite within an underground mining operation. For instance, the work machine 100 can haul excavated ore or other earthen materials from an excavation area to dump sites and then return to the excavation area. In this arrangement, the work machine 100 is one of many similar machines configured to ferry earthen material in a trolley arrangement.

While a large, underground mining truck in this instance, the work machine 100 is any machine that carries a load between different locations within a worksite, examples of which include an articulated truck, an off-highway truck, an on-highway dump truck, a wheel tractor scraper, or any other similar machine. Alternatively, the work machine 100 is an off-highway truck, on-highway truck, a dump truck, an articulated truck, a loader, an excavator, a pipe layer, or a motor grader. In other implementations, the work machine 100 need not haul a load and can be any machine associated with various industrial applications including, but not limited to, mining, agriculture, forestry, construction, and other earth moving machines using articulating joints, and other industrial applications.

Referring to FIG. 1, an example work machine 100 includes a front section 102 and a rear section 104. In some examples, the front section 102 is movably connected to the rear section through an articulating connector, not shown, but illustrated in more detail in FIG. 2, below. In some examples, the front section 102 and the rear section 104 are independently movable in multiple axis of rotation, allowing the front section 102 a degree of movement independent of the rear section 104, explained in more detail in FIG. 7, below. The work machine 100 further includes a cab 106. The cab 106 can be a climate-controlled, interior space in which one or more operators of the work machine 100 occupies during the operation of the work machine 100. The work machine further includes a bucket 108 installed at the rear section 104 of the work machine 100. The bucket 108 is used as the volume in which mined material or other material may be placed for transport. The bucket 108 is raised and lowered using hydraulic pistons, an example of which is illustrated in FIG. 1 as piston 110.

The work machine 100 further includes a power unit 112 that provides power to various electrical equipment of the work machine 100. The power unit 112 houses one or more set or assemblies of batteries (not illustrated), described in more detail in FIG. 2, below. The power unit 112 provides electrical power to wheel assemblies, such as a front wheel assembly 114A and a rear wheel assembly 114B, with complimentary wheel assemblies on the other side of the work machine 100 not shown. The wheel assemblies 114A and 114B are comprised of electrical motors that receive power from the power unit 112 through one or more inverters, described in more detail in FIG. 2. The inverters convert the direct current power provided by the batteries in the power unit 112 into alternating current used by the electrical motors of the wheel assemblies 114A and 114B. The polarity and power provided by the inverters to the wheel assemblies 114A and 114B causes the electrical motors of the wheel assemblies 114A and 114B to rotate, thereby rotating tires 116A and 116B respectively. In some examples, the wheel assemblies 114A and 114B receive power independently. For example, the wheel assembly 114A receives power from an inverter located in the front section 102, while the wheel assembly 114B receives power from an inverter located in the rear section 104. Additionally, a wheel assembly in one section, such as the front section 102 or the rear section 104, is powered independently of the complimentary wheel section in the same section. In this manner, each wheel assembly is operated independently of each other.

In some examples, the power unit 112 is unavailable for use. For example, in some configurations of the work machine 100, the power unit 112 is removable. In other examples, the power unit 112 is discharged to a degree that the power unit 112 cannot provide power at a required level. Another example is a situation in which the power unit 112 is damaged or otherwise electrically disconnected from the work machine 100. In the examples during which the power unit 112 is unavailable for use, a secondary battery 118 is used. In some examples, the secondary battery 118 is used to move the work machine 100 along a haul route by providing electrical power to wheel assemblies 114A and 114B. In still further examples, the secondary battery 118 provides power to other electrical loads, such as, but not limited to, a heating, cooling and ventilation (HVAC) system 120. The HVAC system 120 is used to heat or cool air within the cab 106. In some examples, the secondary battery 118 is used to supplement or augment electrical power provided by the power unit 112 in certain conditions, such as when the power unit 112 is fully discharged and is being changed out for a fully charged the power unit 112. Additional electrical and mechanical systems powered by the power unit 112 and/or the secondary battery are illustrated in FIG. 2, below.

Figure 2:
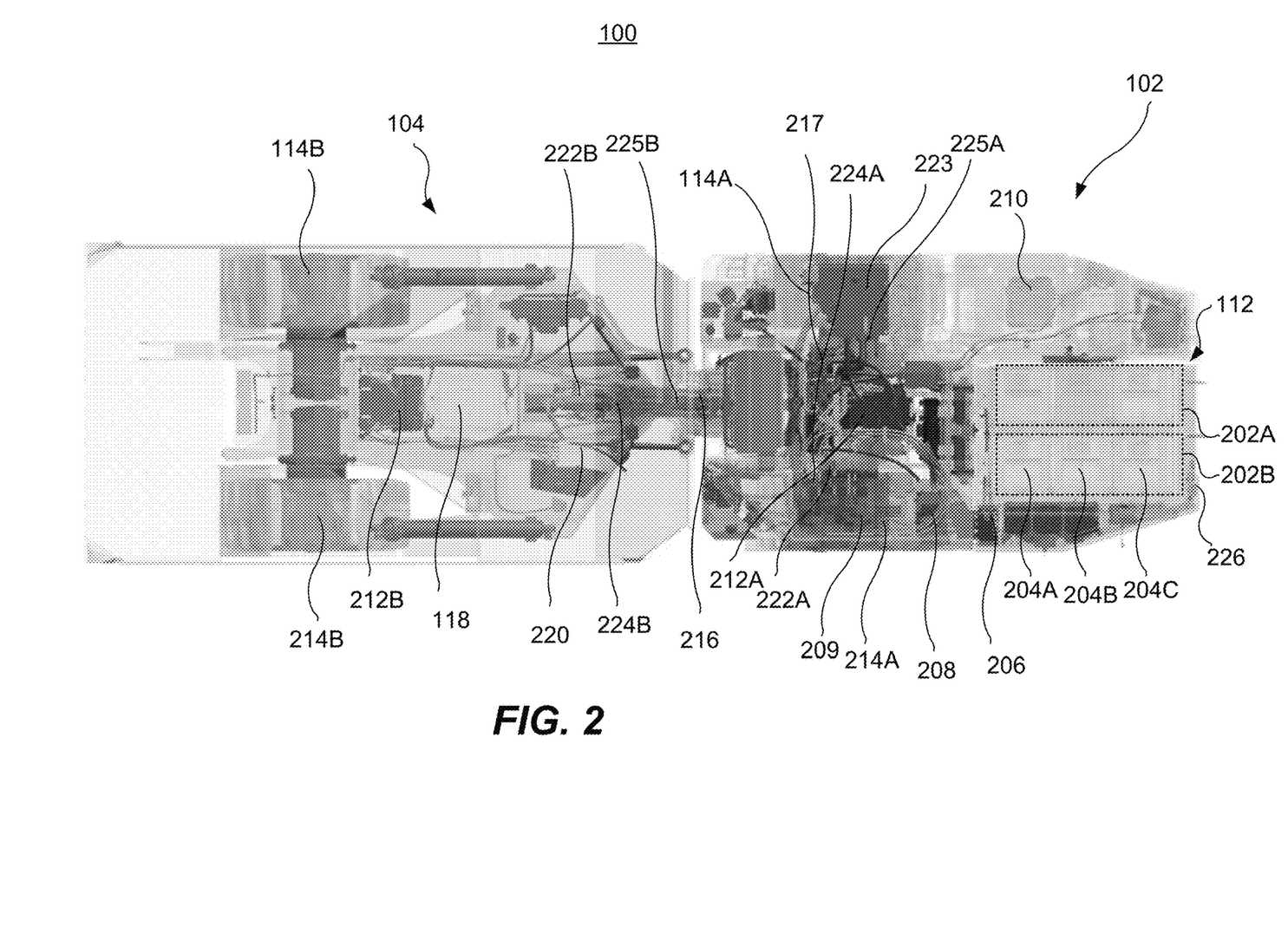
FIG. 2 is a top-down illustration of a work machine, in accordance with one or more examples of the present disclosure.

FIG. 2 is a top-down illustration of the work machine 100, in accordance with one or more examples of the present disclosure. As described above, electrical power to the work machine 100 is provided primarily by the power unit 112. The power unit 112 includes one or more batteries mechanically separated into one or more battery banks, illustrated as battery bank 202A and battery bank 202B. The battery bank 202A and the battery bank 202B include one or more batteries, illustrated by way of example as battery 204A, 204B, and 204C (referred to hereinafter individually as "the battery 204A," "the battery 204B," and "the battery 204C," and collectively as "the batteries 204"). In some examples, the power unit 112 includes other systems used to monitor, control the temperature of, and control various functions of the power unit 112 not described herein. The batteries 204, in some examples, collectively provide relatively high direct current potential.

Electrical power from the power unit 112 is delivered to various equipment through power interface 206. The power interface 206 includes electrical connectors to connect the power unit 112 to various systems of the work machine 100 not included as a component of the power unit 112. An example of the power interface 206 is described in more detail in FIGS. 6 and 7. An example of equipment powered by the power unit 112 is equipment that requires a voltage lower than the voltage output of the power unit 112. In these examples, a low voltage converter 208 is provided. In some examples, the low voltage converter 208 steps down the voltage of the power unit 112 to a lower voltage, such as, but not limited to, 24V. A low voltage battery 210 is used to store power generated by the low voltage converter 208 as well as act as a battery for equipment operating at the lower voltage. The electrical power provided by the low voltage converter 208 is distributed using a power distribution unit 209. In some examples, the power distribution unit 209 receives power from the low voltage converter 208 and distributes that power to the equipment operating at the lower voltage.

It should be noted that, as with other equipment described herein, more than one low voltage converter and low voltage battery can be used, including those at different voltages than the low voltage converter 208.

The power unit 112 can also provide power to equipment that uses alternating current rather than a direct current. In these examples, a front inverter 212A and a rear inverter 212B are provided. The front inverter 212A and the rear inverter 212B receive the power from the power unit 112 and converts the direct current/voltage provided by the power unit 112 to an alternating current/voltage used by various equipment. For example, as discussed in FIG. 1, each wheel assembly of the work machine are individually controllable. Illustrated in FIG. 2 are the wheel assembly 114B introduced in FIG. 1 and wheel assembly 214B. The wheel assemblies are comprised of an electrical motor that use AC power to cause the rotation of a shaft (not shown) of the electrical motor of the wheel assemblies 114B and 214B. The rear inverter 212B receives power (i.e., is in electrical communication with) from the power unit 112 through rear power cable 216. The front inverter 212A receives power from the power unit 112 through front power cable 217. The rear inverter 212B converts the electrical power from the power unit 112 and delivers the AC power to each of the wheel assemblies 114B and 214B, whereby the power delivered to each of the wheel assemblies 114B and 214B may be different as to each other and may be different as to wheel assemblies located in the front section 102, such as the wheel assembly 114A introduced in FIG. 1. In a similar manner, the front inverter 212A converts the electrical power from the power unit 112 and delivers the AC power to each of the wheel assemblies 114A and 214A, whereby the power delivered to each of the wheel assemblies 114A and 214A may be different as to each other and may be different as to wheel assemblies located in the rear section 104, such as the wheel assemblies 114B and 214B. In some examples described herein, the electrical power is a locally distributed power system whereby the front inverter 212A provides electrical power to equipment in the front section 102 and the rear inverter 212B provides electrical power to equipment in the rear section 104. Thus, the electrical power provided by the front inverter 212A and the rear inverter 212B is a locally distributed power system, meaning components receiving power from an inverter receives the power from an inverter located in the same section that the component is located. Thus, in some examples only a single power cable from the front section 102 to the rear section 104 from the power unit 112, i.e., the rear power cable 216, is used to provide power to the rear section 104 components rather than individual power cables to each of the components.

In addition to the low voltage battery 210, as described in FIG. 1, in some examples, the secondary battery 118 is used to power equipment requiring a higher voltage than what may be provided by the low voltage battery 210. In the example in which the power unit 112 is unavailable for use, the secondary battery 118 is used to provide power to the front and rear wheel assemblies, such as the wheel assemblies 114B and 214B, as well as the wheel assemblies 114A and a wheel assembly 214A. In the examples in which the secondary battery 118 is being used as the primary power source, power from the secondary battery 118 may be transmitted to the rear inverter 212B and/or the front inverter 212A to provide AC power to components powered by the rear inverter 212B and/or the front inverter 212A. In some examples, DC power provided by the secondary battery 118 is increased in voltage using a converter 220 (sometimes referred to as a "buck boost inductor," or "buck boost converter"). The converter 220 in some examples is a direct current to direct current converter that outputs a direct current voltage greater than the input voltage. In some examples, the higher voltage output of the converter 220 is received as a power input to the rear inverter 212B and/or the front inverter 212A to provide AC power to components powered by the rear inverter 212B and/or the front inverter 212A.

The work machine 100 further includes a locally distributed hydraulic system that provides hydraulic power hydraulic equipment used by the work machine 100. In FIG. 2, the work machine includes a front hydraulic pump 222A and a rear hydraulic pump 222B. The front hydraulic pump 222A is an electrical pump that receives a hydraulic fluid stored in a hydraulic tank 223 through hydraulic line 225A and pressurizes the hydraulic fluid for use by a front accumulator 224A. Similarly, the rear hydraulic pump 222B is an electrical pump that receives the hydraulic fluid stored in the hydraulic tank 223 through hydraulic line 225B and pressurizes the hydraulic fluid for use by a rear accumulator 224B. In a manner similar to the front inverter 212A and the rear inverter 212B, the front accumulator 224A is used to provide hydraulic pressure to hydraulic loads in the front section 102 and the rear accumulator 224B is used to provide hydraulic pressure to hydraulic loads in the rear section 104. In some examples, the hydraulic lines 225A and 225B are a relatively lower pressure hydraulic line. In this configuration, the hydraulic line from the front section 102 to the rear section 104, i.e., the hydraulic line 225B, is a lower pressure line.

In some examples, the work machine 100 has a first configuration in which the power unit 112 is removably affixed to the work machine 100. In the first configuration, the power unit 112 is charged by an external power source through a charging port 226 located on the work machine 100. Although in the first configuration the power unit 112 can be removed in certain instances such as during maintenance, the power unit 112 and the work machine 100 are configured to be primarily a combined, single unit during the use of the work machine 100. A cable (not shown) from the external power source is mechanically and electrically attached to the charging port 226. Electrical power is then transferred through the charging port 226 into the batteries 204 of the power unit 112 to recharge the batteries 204. When using the first configuration, because the power unit 112 remains electrically and mechanically connected to the work machine 100, some components described in FIG. 2 may not be needed. For example, the secondary battery 118, the power interface 206, and the converter 220 may not be required or desired in the first configuration. It should be understood, however, one or more of the aforementioned components, and other components not mentioned, may still be installed regardless of the configuration of the work machine 100. The work machine 100 may also have a second configuration in which the power unit 112 is removed and replaced with a second power unit. In the second configuration, when a new power unit 112 is to be used, the work machine 100 and the power unit 112 are configured to allow the power unit 112 to be removed from the work machine 100, after which a new, charged power unit 112 is installed onto the work machine, illustrated in more detail in FIGS. 3 and 4.

Figure 3:
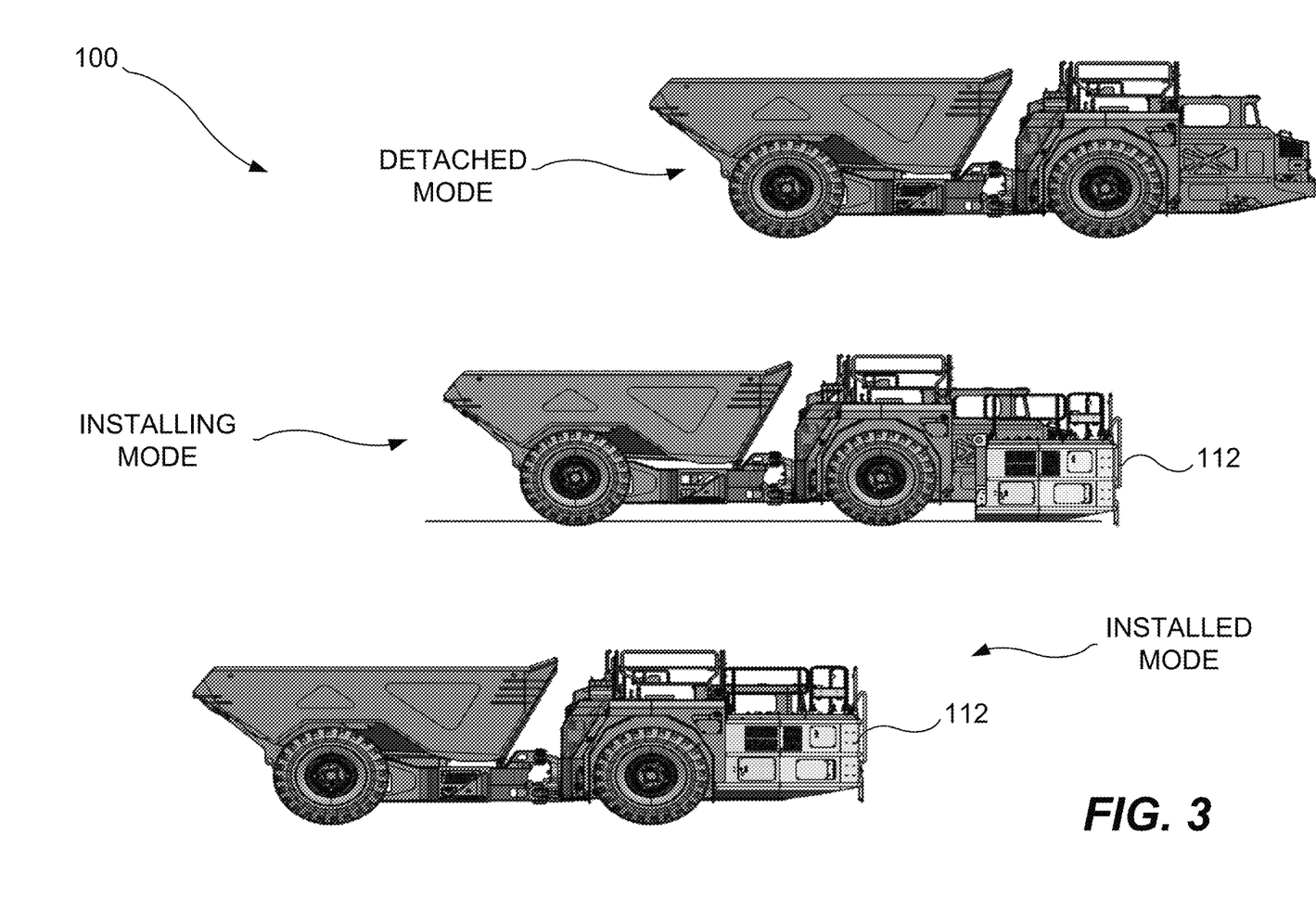
FIG. 3 illustrates the process of installing a power unit onto a work machine, in accordance with one or more examples of the present disclosure.

FIG. 3 illustrates the process of installing the power unit 112 onto the work machine in the second configuration of the work machine 100, in accordance with one or more examples of the present disclosure. Illustrated in FIG. 3 are a detached mode, an installing mode, and an installed mode of the work machine 100 in relation to the installation status of the power unit 112. In the detached mode, the work machine 100 is not engaged, or is disengaged, with a power unit. An example of the detached mode may include, but is not limited to, a period in which maintenance is being performed on the work machine 100 and no power unit 112 is needed. Another example of the detached mode may be when the work machine 100 has previously detached a power unit and is moving to another location to receive a new power unit. The installing mode represents the configuration in which the work machine 100 is moving or has moved to a location suitable to engage and receive the power unit 112. The installed mode represents the configuration in which the work machine 100 has received the power unit 112 and have mechanically and electrically connected the power unit 112 to the work machine 100 using a lift mechanism and the power interface 206, illustrated in additional detail in FIG. 4.

Figure 4:
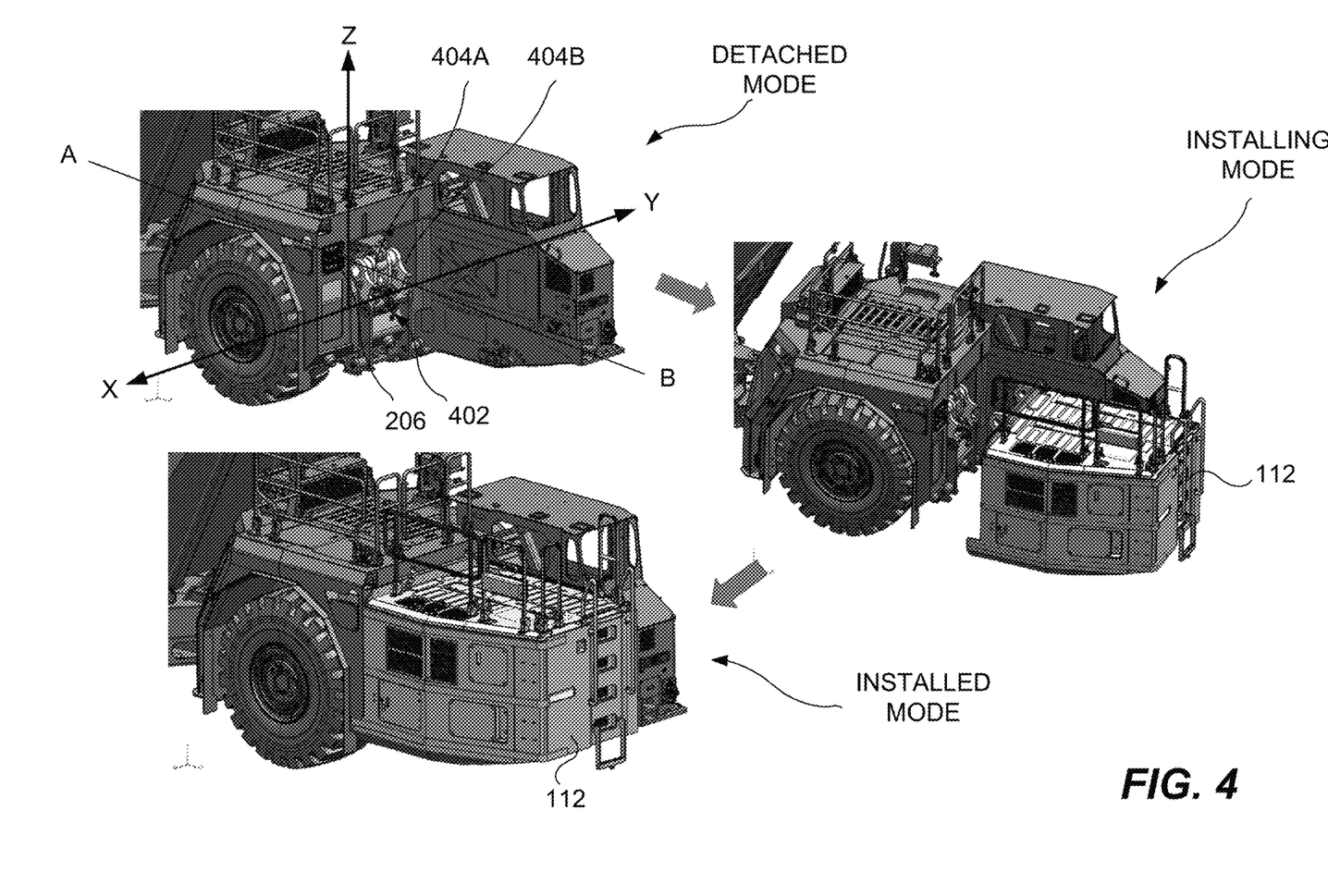
FIG. 4 is an illustration showing a lift mechanism used to mechanically engage a power unit with a work machine, in accordance with one or more examples of the present disclosure.

FIG. 4 is an illustration showing a lift mechanism 402 used to mechanically engage the power unit 112 with the work machine 100 and the power interface 206 used to electrically engage the power unit 112 with the work machine 100, in accordance with one or more examples of the present disclosure. FIG. 4 shows the detached mode, the installing mode, and the installed mode of the work machine 100. To mechanically engage the power unit 112 with the work machine 100, the lift mechanism 402 is provided. The lift mechanism 402 rotates about an axis XY, whereby the axis XY is normal to a centerline AB of the work machine 100. Lifter arms 404A and 404B engage with the power unit 112. When rotated about the axis XY, the lifter arms 404A and 404B move in the direction Z, lifting the power unit 112 off the ground and engaging the power unit 112 with the work machine 100. The lifter arms 404A and 404B are rotated using hydraulic power or electrical power. When the lifter arms 404A and 404B rotate to engage the power unit 112 with the work machine 100, electrical connections from the power unit are proved through the power interface 206 located on the work machine 100, described in additional detail in FIG. 5.

Figure 5:
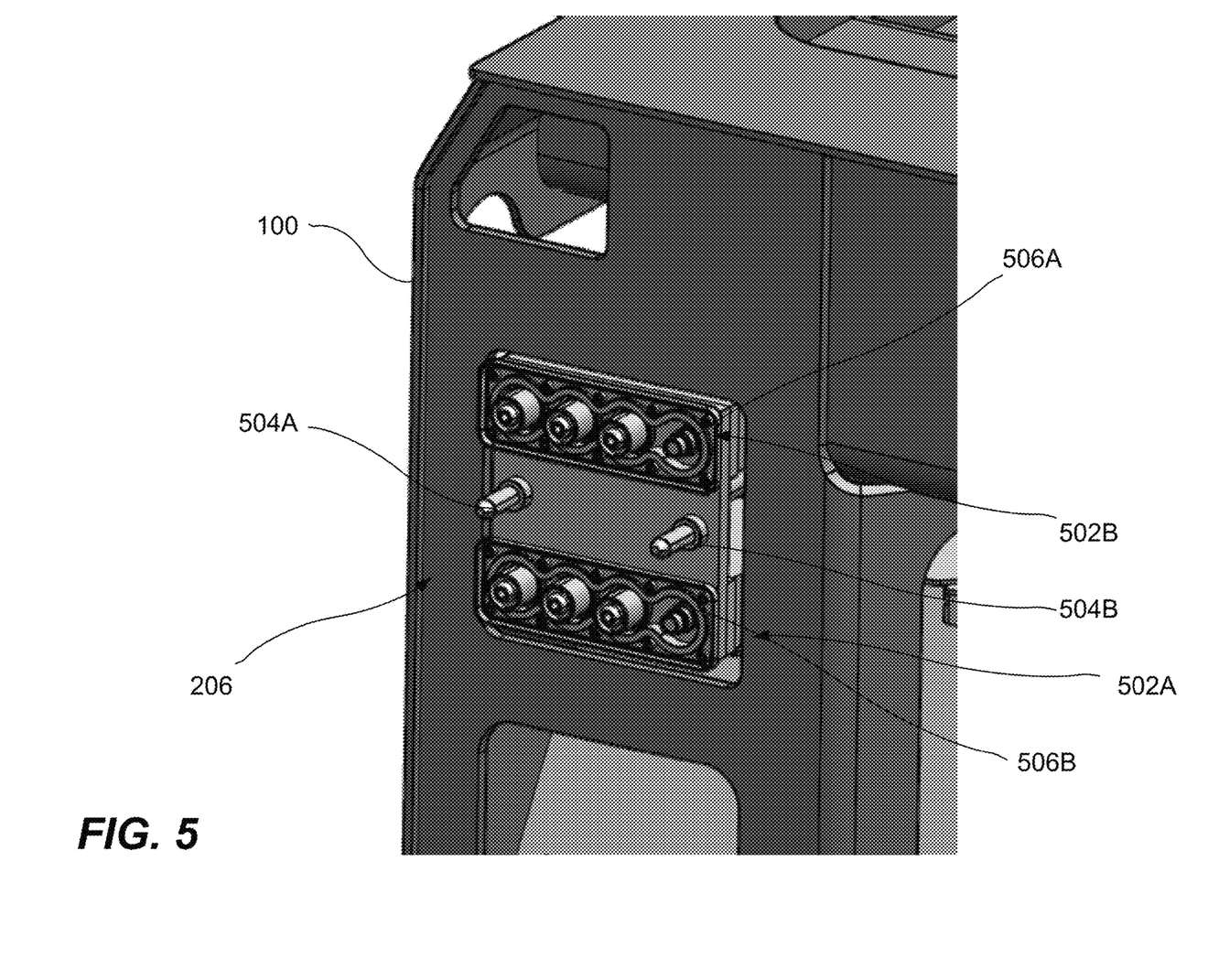
FIG. 5 is an illustration showing a power interface of a work machine, in accordance with one or more examples of the present disclosure.

FIG. 5 is an illustration showing the power interface 206 of the work machine 100, in accordance with one or more examples of the present disclosure. The power interface 206 includes male connectors 502A and 502B. The male connectors 502A and 502B extend a distance out from the work machine 100 to engage with complimentary female connectors, illustrated in FIG. 6. The power interface 206 further includes alignment pins 504A and 504B that also extend a distance out from the work machine 100 and engage with complementary female alignment holes shown in FIG. 6. The alignment pins 504A and 504B act as an indicator that the power unit 112, when lifted into the installed mode of FIGS. 3 and 4, is properly aligned and positioned onto the work machine 100. The male connectors 502A and 502B are electrically connected with various systems and are designed to receive various electrical inputs. For example, power connector 506A are configured to receive electrical power from the battery bank 202A and power connector 506B are configured to receive electrical power from the battery bank 202B. In some configurations, the battery bank 202A and the battery bank 202B are electrically connected so that the power from both the battery bank 202A and the battery bank 202B is provided through a single positive terminal and a single negative terminal. Thus, in this configuration, the power connector 506A are configured to receive electrical power from the positive terminal of the battery banks 202A and 202B and the power connector 506B are configured to connect to the negative or ground terminal of the battery banks 202A and 202B. The male connectors 502A and 502B may provide an electrical connection for other electrical signals such as data, communication systems, additional power systems, sensors, and the like.

Figure 6:
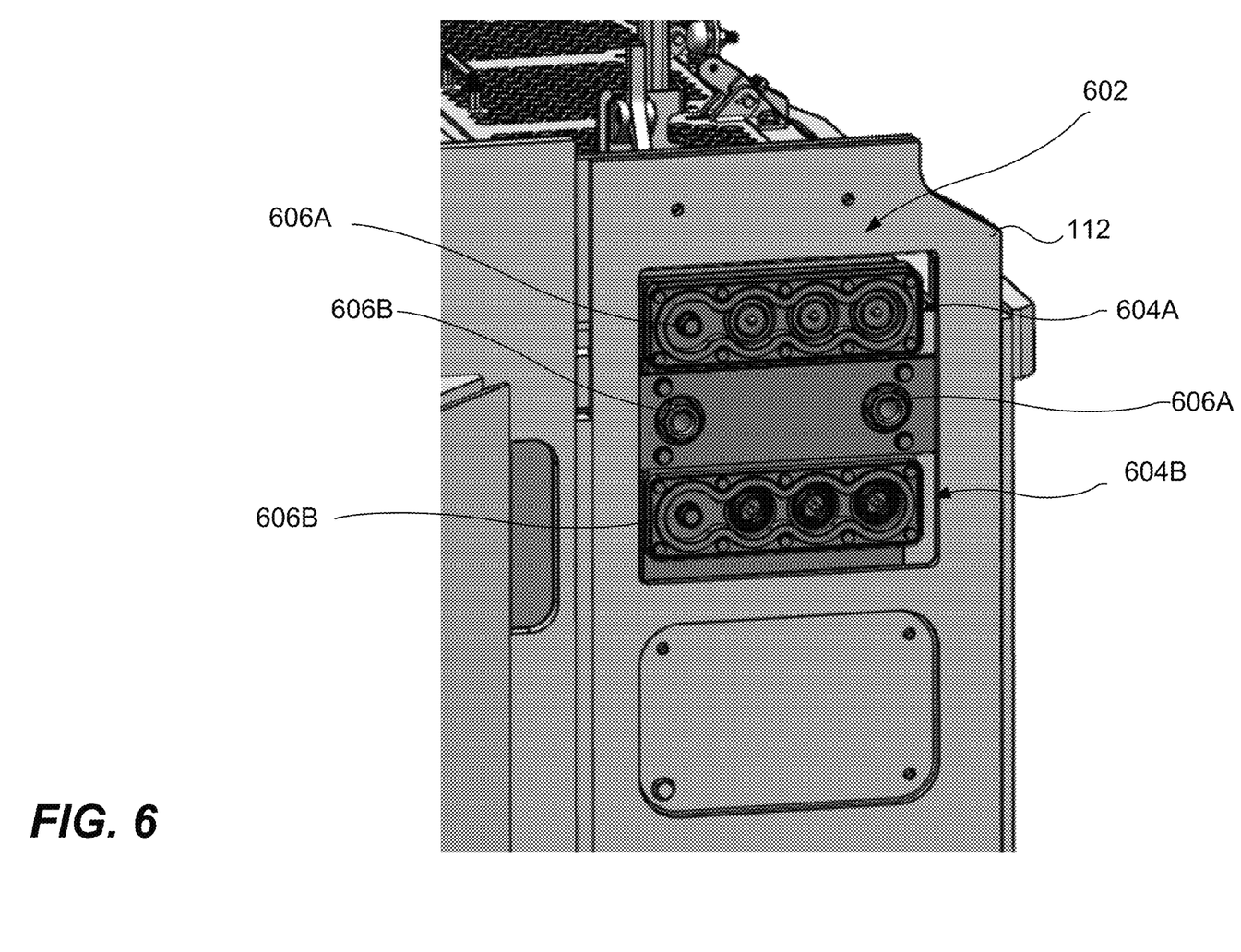
FIG. 6 is an illustration showing a power unit interface of a power unit used to electrically connect the power unit with a work machine, in accordance with one or more examples of the present disclosure.

FIG. 6 is an illustration showing a power unit interface 602 of the power unit 112 used to electrically connect the power unit 112 with the work machine 100, in accordance with one or more examples of the present disclosure. The power unit interface 602 includes female recesses 604A and 604B. The female recesses 604A and 604B extend a distance into the work machine 100 to receive the complementary male connectors 502A and 502B of the power interface 206 that are inserted into complementary female recesses 604A and 604B. The power unit interface 602 further includes alignment recesses 606A and 606B that receive the alignment pins 504A and 504B. The female power connector 608A receives the power connector 506A and the female power connector 608B receives the power connector 506B to be distributed to various systems, including locally distributed systems such as the wheel assemblies 114A, 114B, 214A, and 214B. In some examples, data networks (or controller area networks) associated with the work machine 100 may also be locally distributed, as describe in more detail in FIG. 7.

Figure 7:
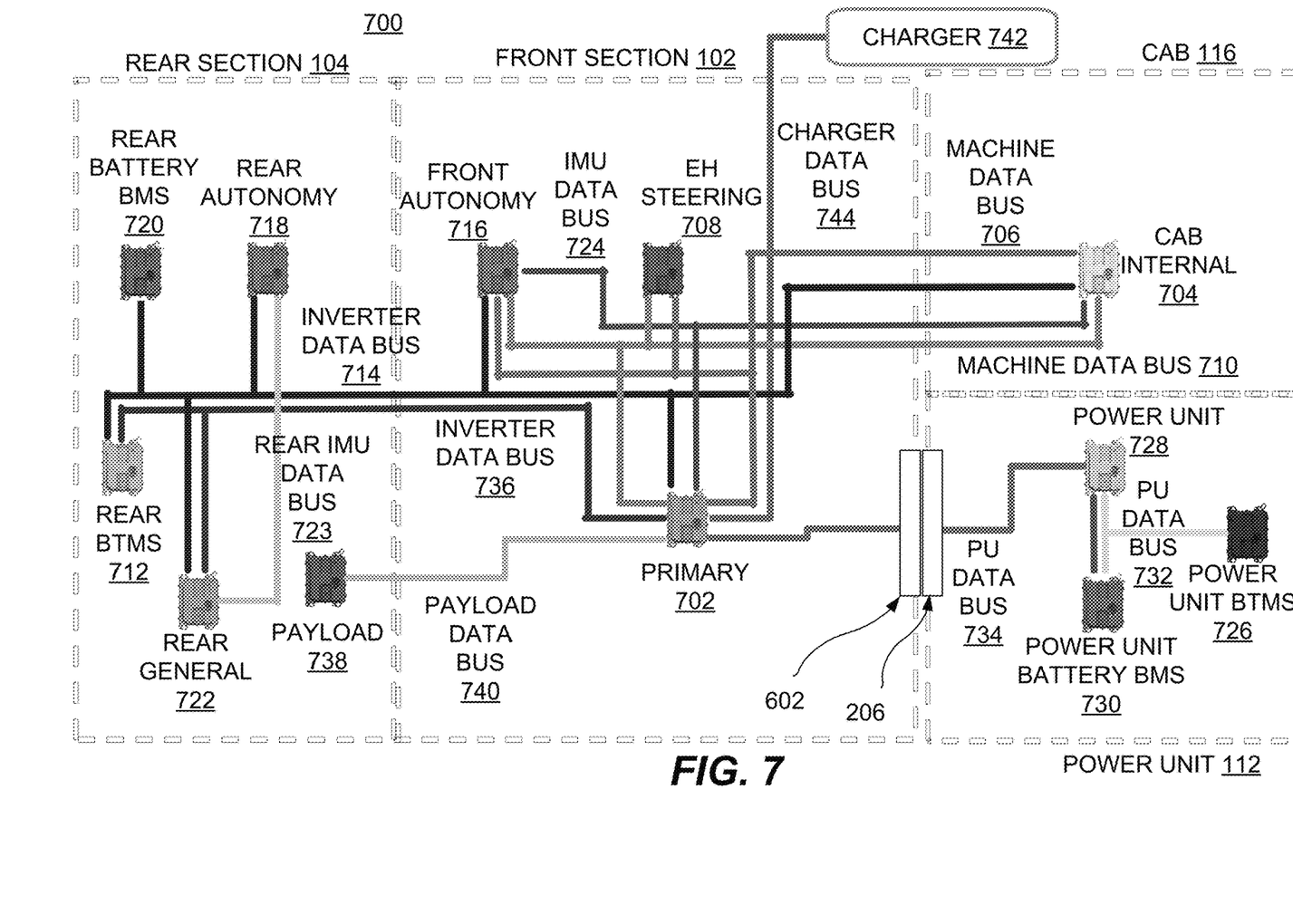
FIG. 7 is an illustration showing distributed controller area network, in accordance with one or more examples of the present disclosure.

FIG. 7 is an illustration showing a controller area network 700, in accordance with one or more examples of the presently disclosed subject matter. Various controllers of the controller area network 700 are installed in various sections of the work machine 100, including the cab 116, the power unit 112, the front section 102, and the rear section 104. The controller area network 700 is used in the work machine 100 to monitor and control various functions of the work machine 100. In FIG. 7, the work machine 100 controller area network 700 includes a primary controller 702. The primary controller 702 receives primary controller data and provides primary controller control signals over the controller area network 700 from various systems of the work machine 100. It should be noted that the data and control signals described herein below are examples. The presently disclosed subject matter is not limited to the data and control signals described herein. As illustrated in FIG. 7, the cab 116 includes a cab internal controller 704. The cab internal controller 704 receives data such as the temperature of the air inside the cab 116 from an air temperature sensor (not shown). The cab internal controller 704 also receives inputs such as steering, acceleration, braking, and the like. The cab internal controller 704 communicates with the primary controller 702 over a machine data bus 706. The cab internal controller 704 also communicates with other controllers over different data buses. For example, the cab internal controller 704 communicates with an EH steering controller 708 over the machine data bus 706. The EH steering controller 708 receives steering control inputs from the cab internal controller 704 and outputs control signals to steer the work machine 100 based on those steering control inputs.

The cab internal controller 704 further communicates with a rear battery thermal management system (BTMS) controller 712 over an inverter data bus 714. In some examples, the rear BTMS controller 712 receives data relating to one or more temperatures of the secondary battery 118. The data relating to one or more temperatures of the secondary battery 118 may be received at the cab internal controller 704 to provide data to various indicators to be used by the operator of the work machine 100. The cab internal controller 704 further communicates with a front autonomy controller 716 and a rear autonomy controller 718 over the inverter bus 714. In some examples, the front autonomy controller 716 and the rear autonomy controller 718 are controllers that receive inputs and communicates information about autonomous or semi-autonomous systems. Autonomous or semi-autonomous systems are systems that allow the remote or automatic control of various aspects of the work machine 100 with little to no human interaction by receiving remote inputs that are control inputs (remote control) received from remote control devices (not shown). In other examples, autonomous or semi-autonomous systems are systems that allow an operator to operate more than one work machine 100. In still further examples, the cab internal controller 704 communicates with a rear battery battery management system (BMS) 720. In some examples, the rear battery BMS 720 is used to monitor the condition of the secondary battery such as the charge, the discharge rate, and the like. The cab internal controller 704 further communicates with a rear general controller 722 over the inverter data bus 714. The rear general controller 722 is used to control systems in the rear section 104 of the work machine 100, such as the systems that raise or lower the bucket 108. The rear general controller communicates with the rear autonomy controller 718 over a rear IMU data bus 723. The cab internal controller 704 further communicates with the primary controller 702 the front autonomy controller 716 and the EH steering controller 708 over an inertial management unit (IMU) data bus 724.

For the power unit 112, a power unit battery thermal management system (BTMS) 726 communicates with a power unit controller 728, and a power unit battery management system (BMS) 730 over a power unit (PU) data bus 732. The power unit battery thermal management system (BTMS) 726 and the power unit controller 728 provide functionality similar to the rear BTMS controller 712 and the rear battery BMS controller 720, respectively, for the batteries of the power unit 112. The power unit controller 728 receives data from the power unit battery thermal management system (BTMS) 726 and the power unit controller 728 and provides power unit data to the primary controller 702 over a power unit (PU) data bus 734 through the power unit interface 602 and the power interface 206. The primary controller 702 communicates with additional controllers. For example, the primary controller 702 communicates with the rear general controller 722 and the rear BTMS controller 712 over an inverter data bus 736. The primary controller 702 further communicates with a payload controller 738 over a payload data bus 740. The primary controller 702 also communicates with a charger 742 over a charger data bus 744. As described above, in some configurations, the work machine 100 may be connected to an external power source from the charger 742 to charge the power unit 112. The primary controller 702 communicates with the charger 742 to control the charging of the power unit 112, monitor the status of the charging of the power unit 112, and the like.

As illustrated in FIG. 7, the controller area network 700 is designed to have redundancy for controllers having a designed relatively higher importance to the control of the work machine 100 (tier 1 controllers) over controllers designated as having a relatively lower importance to the control of the work machine 100 (tier 2 controllers). As used herein, a tier 1 controller is a controller that primarily issues commands to other controllers and the tier 2 controllers primarily receive commands from other controllers. In another example, a tier 1 controller is a controller that effects the safety of personnel and equipment. For example, the primary controller 702 is a tier 1 controller because the primary controller 702 primary issues commands to, or controls, a significant portion of the controllers of the work machine 100. In another example, the cab internal controller 704, used to provide the work machine 100 operator with data and control functionality of the work machine 100, is also a tier 1 controller. As used herein, "redundancy" means that the controller can still communicate with other controllers if a data bus is not available for use. For example, the primary controller 702 can communicate with the rear battery BMS controller 720, the rear BTMS controller 712, the rear general controller 722, and the rear autonomy controller 718 over the inverter data bus 714 and/or the inverter data bus 736. Thus, if either the inverter data bus 714 or the inverter data bus 736 is rendered unusable, the primary controller 702 can still communicate with the rear battery BMS controller 720, the rear BTMS controller 712, the rear general controller 722, and the rear autonomy controller 718 over the other data bus. Thus, the controllers controlling the systems located in the rear section 104 can receive communication from the primary controller 702 even if one of the data buses from the primary controller 702 are rendered unusable.

In another example, a tier 1 controller is a controller that effects the safety of personnel and equipment. For example, the cab internal controller 704 communicates with the primary controller 702 and the EH steering controller 708 using the machine data bus 706 and/or the machine data bus 710. Thus, if the machine data bus 706 were to become unusable, the operator can still use the cab internal controller 704 to provide steering inputs to the primary controller 702. Further, the controller area network 700 is designed to have redundancy for some of the controllers that communicate over a physical barrier. For example, the rear section 104 is attached the front section 102 using an articulating connector, meaning the rear section 104 rotates in various degrees of freedom independently of the front section 102. Because of the relative movement between the front section 102 and the rear section 104, more than one data bus, such as the inverter data buses 714 and 736, as well as the machine data buses 706 and 710, may be used communicate with the primary controller 702. Therefore, tier 1 controllers of the controller area network 700, such as the cab internal controller 704 and the primary controller 702 have redundant communication data buses, whereas tier 2 controllers can have a single data bus.

Figure 8:
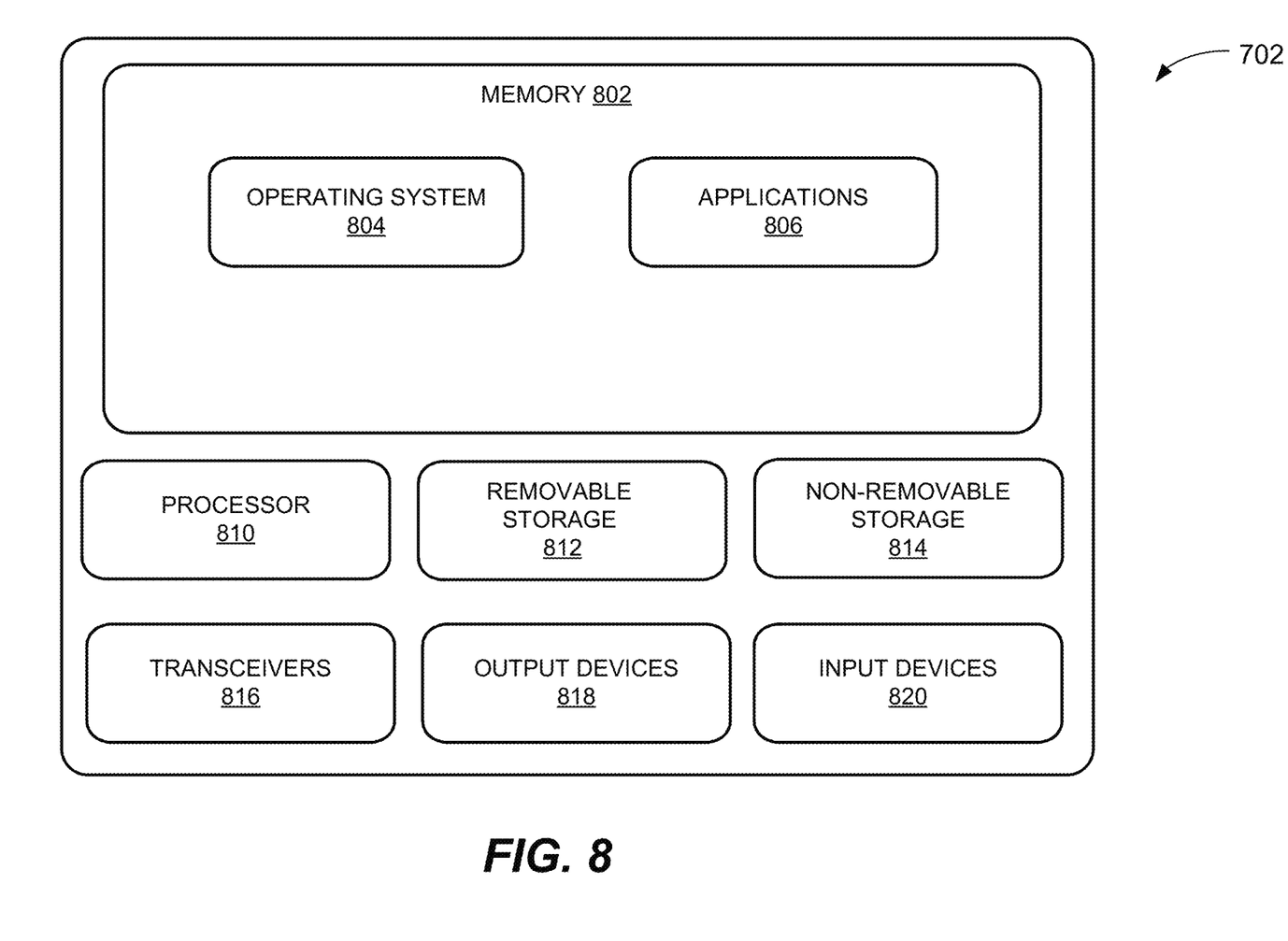
FIG. 8 depicts a component level view of a controller for use with the systems and methods described herein, in accordance with various examples of the presently disclosed subject matter.

FIG. 8 depicts a component level view of the primary controller 702 for use with the systems and methods described herein, in accordance with various examples of the presently disclosed subject matter. Although FIG. 8 discloses the primary controller 702, the components described herein are also used for other controllers, such as the cab internal controller 704. The primary controller 702 could be any device capable of providing the functionality associated with the systems and methods described herein. The primary controller 702 can comprise several components to execute the above-mentioned functions. The primary controller 702 may be comprised of hardware, software, or various combinations thereof. As discussed below, the primary controller 702 can comprise memory 802 including an operating system (OS) 804 and one or more standard applications 806.

The primary controller 702 can also comprise one or more processors 810 and one or more of removable storage 812, non-removable storage 814, transceiver(s) 816, output device(s) 818, and input device(s) 820. In various implementations, the memory 802 can be volatile (such as random access memory (RAM)), non-volatile (such as read only memory (ROM), flash memory, etc.), or some combination of the two. The memory 802 be stored on a remote server or a cloud of servers accessible by the primary controller 702.

The memory 802 can also include the OS 804. The OS 804 varies depending on the manufacturer of the primary controller 702. The OS 804 contains the modules and software that support basic functions of the primary controller 702, such as scheduling tasks, executing applications, and controlling peripherals. The OS 804 can also enable the primary controller 702 to send and retrieve other data and perform other functions, such as transmitting control signals using the transceivers 816 and/or output devices 818 and receiving signals using the input devices 820.

The primary controller 702 can also comprise one or more processors 810. In some implementations, the processor(s) 810 can be one or more central processing units (CPUs), graphics processing units (GPUs), both CPU and GPU, or any other combinations and numbers of processing units. The primary controller 702 may also include additional data storage devices (removable and/or non-removable) such as, for example, magnetic disks, optical disks, or tape. Such additional storage is illustrated in FIG. 8 by removable storage 812 and non-removable storage 814.

Non-transitory computer-readable media may include volatile and nonvolatile, removable and non-removable tangible, physical media implemented in technology for storage of information, such as computer readable instructions, data structures, program modules, or other data. The memory 802, removable storage 812, and non-removable storage 814 are all examples of non-transitory computer-readable media. Non-transitory computer-readable media include, but are not limited to, RAM, ROM, electronically erasable programmable ROM (EEPROM), flash memory or other memory technology, compact disc ROM (CD-ROM), digital versatile discs (DVD) or other optical storage, magnetic cassettes, magnetic tape, magnetic disk storage or other magnetic storage devices, or any other tangible, physical medium which can be used to store the desired information, which can be accessed by the primary controller 702. Any such non-transitory computer-readable media may be part of the primary controller 702 or may be a separate database, databank, remote server, or cloud-based server.

In some implementations, the transceiver(s) 816 include any transceivers known in the art. In some examples, the transceiver(s) 816 can include wireless modem(s) to facilitate wireless connectivity with other components (e.g., between the primary controller 702 and a wireless modem that is a gateway to the Internet), the Internet, and/or an intranet. Specifically, the transceiver(s) 816 can include one or more transceivers that can enable the primary controller 702 to send and receive data. Thus, the transceiver(s) 816 can include multiple single-channel transceivers or a multi-frequency, multi-channel transceiver to enable the primary controller 702 to send and receive video calls, audio calls, messaging, etc. The transceiver(s) 816 can enable the primary controller 702 to connect to multiple networks including, but not limited to 2G, 3G, 4G, 5G, and Wi-Fi networks, or other controllers. The transceiver(s) 816 can also include one or more transceivers to enable the primary controller 702 to connect to future (e.g., 6G) networks, Internet-of-Things (IoT), machine-to machine (M2M), and other current and future networks.

The transceiver(s) 816 may also include one or more radio transceivers that perform the function of transmitting and receiving radio frequency communications via an antenna (e.g., Wi-Fi or Bluetooth®). In other examples, the transceiver(s) 816 may include wired communication components, such as a wired modem or Ethernet port, for communicating via one or more wired networks. The transceiver(s) 816 can enable the primary controller 702 to facilitate audio and video calls, download files, access web applications, and provide other communications associated with the systems and methods, described above.

In some implementations, the output device(s) 818 include any output devices known in the art, such as a display (e.g., a liquid crystal or thin-film transistor (TFT) display), a touchscreen, speakers, a vibrating mechanism, or a tactile feedback mechanism. Thus, the output device(s) can include a screen or display. The output device(s) 818 can also include speakers, or similar devices, to play sounds or ringtones when an audio call or video call is received. Output device(s) 818 can also include ports for one or more peripheral devices, such as headphones, peripheral speakers, or a peripheral display.

In various implementations, input device(s) 820 include any input devices known in the art. For example, the input device(s) 820 may include a camera, a microphone, or a keyboard/keypad. The input device(s) 820 can include a touch-sensitive display or a keyboard to enable users to enter data and make requests and receive responses via web applications (e.g., in a web browser), make audio and video calls, and use the standard applications 406, among other things. A touch-sensitive display or keyboard/keypad may be a standard push button alphanumeric multi-key keyboard (such as a conventional QWERTY keyboard), virtual controls on a touchscreen, or one or more other types of keys or buttons, and may also include a joystick, wheel, and/or designated navigation buttons, or the like. A touch sensitive display can act as both an input device 820 and an output device 818.

INDUSTRIAL APPLICABILITY

The work machine 100 described herein uses a controller area network 700 that provides for redundant data buses for tier 1 controllers. As described above, the work machine 100 may be used in environments that may place a degree of wear and tear on the equipment installed on the work machine 100. For example, the work machine 100 may be used for underground mining. These environments typically have haul routes that are not level, imparting vibrations and torsional stresses on the work machine 100. Further, as described above, the front section 102 of the work machine 100 may rotate or move in various degrees of freedom independently of the front section 104. Data buses routed from the front section 102 to the rear section 104 may experience forces caused by the independent rotation and movement. This can lead to equipment damage and/or failure.

Because of the environmental impact on the data buses, the controller area network 700 uses redundancy to decrease the probability of a complete communication failure. As described above by way of example, the primary controller 702 can communicate with the rear battery BMS controller 720, the rear BTMS controller 712, the rear general controller 722, and the rear autonomy controller 718 over the inverter data bus 714 and/or the inverter data bus 736. Thus, if either the inverter data bus 714 or the inverter data bus 736 is rendered unusable, the primary controller 702 can still communicate with the rear battery BMS controller 720, the rear BTMS controller 712, the rear general controller 722, and the rear autonomy controller 718 over the other data bus.

However, tier 1 controllers can include controllers that relate to safety. For example, it is important for the operator of the work machine 100 to be able to control the work machine 100. If unable to control the work machine, including the ability to steer the work machine 100, the failure may place the controller and other personnel in danger. Thus, the cab internal controller 704 is also a tier 1 controller having redundancy. As described above, the cab internal controller 704 communicates with the primary controller 702 and the EH steering controller 708 using the machine data bus 706 and/or the machine data bus 710. Thus, if the machine data bus 706 were to become unusable, the operator can still use the cab internal controller 704 to provide steering inputs to the primary controller 702. Thus, the safety of the work machine 100 can be maintained.

Unless explicitly excluded, the use of the singular to describe a component, structure, or operation does not exclude the use of plural such components, structures, or operations or their equivalents. As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A controller area network to control a work machine, the controller comprising:
    a cab internal controller configured to communicate operator control data received from control inputs of the work machine to a primary controller and a steering controller, wherein the cab internal controller is a tier 1 controller that communicates with the primary controller and the steering controller over a first machine data bus or a second machine data bus; and
    the primary controller configured to receive the operator control data from the cab internal controller over the first machine data bus or the second machine data bus, wherein the primary controller is further configured to issue machine control data over a first inverter bus or a second inverter bus to a plurality of second controllers.

2. The controller area network of claim 1, wherein the first machine data bus or the second machine data bus are routed from a cab of the work machine to a front section of the work machine.

3. The controller area network of claim 2, wherein the first inverter bus or the second inverter bus are routed from the front section of the work machine to a rear section of the work machine.

4. The controller area network of claim 1, wherein a second controller of the plurality of second controllers comprises a rear battery battery management system configured to monitor a secondary battery.

5. The controller area network of claim 1, wherein a second controller of the plurality of second controllers comprises front autonomy controller configured to receive a remote input for the primary controller to control a component in a front section of the work machine.

6. The controller area network of claim 1, wherein a second controller of the plurality of second controllers comprises rear autonomy controller configured to receive a remote input for the primary controller to control a component in a rear section of the work machine.

7. The controller area network of claim 1, wherein a second controller of the plurality of second controllers comprises a power unit controller configured to provide the primary controller data over a power unit data bus, wherein the primary controller data comprises power unit data of a power unit that provides electrical power to the work machine.

8. The controller area network of claim 7, wherein the power unit data bus is routed through a power unit interface and a power interface from the power unit to a front section of the work machine.

9. The controller area network of claim 8, wherein the power unit data is received from a power unit battery thermal management system or a power unit battery management system.

10. A work machine, comprising:
    a power unit configured to provide electrical power to the work machine, wherein the power unit is removably attached to the work machine;
    a cab comprising a cab internal controller configured to communicate operator control data received from a control input of the work machine to a primary controller and a steering controller, wherein the cab internal controller is a tier 1 controller that communicates with the primary controller and the steering controller over a first machine data bus or a second machine data bus; and
    a front section comprising a primary controller configured to receive the operator control data from the cab internal controller over the first machine data bus or the second machine data bus, wherein the primary controller is further configured to issue machine control data over a first inverter bus or a second inverter bus to a plurality of second controllers.

11. The work machine of claim 10, wherein the first machine data bus or the second machine data bus are routed from a cab of the work machine to a front section of the work machine.

12. The work machine of claim 11, wherein the first inverter bus or the second inverter bus are routed from the front section of the work machine to a rear section of the work machine.

13. The work machine of claim 10, wherein a second controller of the plurality of second controllers comprises a rear battery battery management system configured to monitor a secondary battery.

14. The work machine of claim 10, wherein a second controller of the plurality of second controllers comprises front autonomy controller configured to receive a remote input for the primary controller to control a component in a front section of the work machine.

15. The work machine of claim 10, wherein a second controller of the plurality of second controllers comprises rear autonomy controller configured to receive a remote input for the primary controller to control a component in a rear section of the work machine.

16. The work machine of claim 10, wherein a second controller of the plurality of second controllers comprises a power unit controller configured to provide the primary controller data over a power unit data bus, wherein the primary controller data comprises power unit data of a power unit that provides electrical power to the work machine.

17. A controller area network of a work machine, comprising:
    a cab internal controller comprising:
        a first memory storing computer-executable instructions; and
        a first processor in communication with the memory, the computer-executable instructions causing the first processor to perform acts comprising:
            communicating operator control data received from a control input of the work machine to a primary controller and a steering controller, wherein the cab internal controller is a tier 1 controller that communicates with the primary controller and the steering controller over a first machine data bus or a second machine data bus; and
    a primary controller comprising:
        a second memory storing computer-executable instructions; and
        a second processor in communication with the memory, the computer-executable instructions causing the second processor to perform acts comprising:
            receiving the operator control data from the cab internal controller over the first machine data bus or the second machine data bus; and
            issuing machine control data over a first inverter bus or a second inverter bus to a plurality of second controllers.

18. The controller area network of claim 17, wherein the first machine data bus or the second machine data bus are routed from a cab of the work machine to a front section of the work machine.

19. The controller area network of claim 18, wherein the first inverter bus or the second inverter bus are routed from the front section of the work machine to a rear section of the work machine.

20. The controller area network of claim 17, further comprising a power unit controller, wherein the power unit controller comprises:
    a third memory storing computer-executable instructions; and
    a third processor in communication with the memory, the computer-executable instructions causing the second processor to perform acts comprising:
        receiving power unit data of a power unit that provides electrical power to the work machine, wherein received from a power unit battery thermal management system or a power unit battery management system; and
        transmitting the power unit data to the primary controller over a power unit data bus routed through a power unit interface and a power interface from the power unit to a front section of the work machine.

\* \* \* \* \*